US009852552B2

(12) United States Patent
Kalan

(10) Patent No.: US 9,852,552 B2
(45) Date of Patent: Dec. 26, 2017

(54) ONBOARD UNIT AND METHOD FOR UPDATING GEODATA THEREIN

(71) Applicant: Kapsch TrafficCom AG, Vienna (AT)

(72) Inventor: Manfred Kalan, Klagenfurt (AT)

(73) Assignee: Kapsch TrafficCom AG, Vienna (AT)

( * ) Notice: Subject to any disclaimer, the term of this patent is extended or adjusted under 35 U.S.C. 154(b) by 344 days.

(21) Appl. No.: 14/656,339

(22) Filed: Mar. 12, 2015

(65) Prior Publication Data

US 2015/0278978 A1    Oct. 1, 2015

(30) Foreign Application Priority Data

Mar. 27, 2014  (EP) ..................................... 14161989

(51) Int. Cl.
| | |
|---|---|
| *G07B 15/06* | (2011.01) |
| *G01C 21/32* | (2006.01) |
| *G06F 17/30* | (2006.01) |
| *G01C 21/20* | (2006.01) |
| *G01S 19/42* | (2010.01) |

(Continued)

(52) U.S. Cl.
CPC ............. *G07B 15/06* (2013.01); *G01C 21/20* (2013.01); *G01C 21/32* (2013.01); *G01S 19/42* (2013.01); *G06F 17/30241* (2013.01); *G06F 17/30961* (2013.01); *G06Q 20/145* (2013.01); *G06Q 50/30* (2013.01); *G07B 15/063* (2013.01)

(58) Field of Classification Search
None
See application file for complete search history.

(56) References Cited

U.S. PATENT DOCUMENTS 7,082,443 B1 *   7/2006   Ashby ................... G01C 21/32
                                               342/357.41
7,849,091 B1 *  12/2010   Cho .................. G06F 17/30911
                                               707/743

(Continued)

FOREIGN PATENT DOCUMENTS

WO     2009/102284 A1    8/2009
WO     2011/068698 A2    6/2011

OTHER PUBLICATIONS

European Search Report received for European Patent Application No. 14161989.0, dated Nov. 13, 2014, 4 pages.

*Primary Examiner* — Kevin H Flynn
*Assistant Examiner* — Emmett K. Walsh
(74) *Attorney, Agent, or Firm* — Fiala & Weaver P.L.L.C.

(57) ABSTRACT

An onboard unit for levying tolls for a vehicle comprises a satellite navigation receiver for generating position fixes, a memory for recording geoobjects, a radio interface, and a processor, which generates toll data from a geographical comparison of position fixes with geoobjects in a digital map and transmits this data via the radio interface. The memory has an index memory region for an index tree for geoobjects, a first static object memory region for a primary list with geoobjects, and a second object memory region, which can be written dynamically via the radio interface, for a secondary list with geoobjects. At least one leaf of the index tree contains a reference to a secondary list, and wherein the processor is configured, upon accessing a geoobject via a leaf, to use the secondary list before the primary list. A method for updating geodata in such an onboard unit is also disclosed.

14 Claims, 2 Drawing Sheets

(51) Int. Cl.
  *G06Q 20/14*    (2012.01)
  *G06Q 50/30*    (2012.01)

(56) References Cited

U.S. PATENT DOCUMENTS

| | | | |
|---|---|---|---|
| 2004/0205517 A1* | 10/2004 | Lampert | G01C 21/32 |
| | | | 715/249 |
| 2011/0004583 A1* | 1/2011 | Honda | G06F 17/30457 |
| | | | 707/609 |
| 2013/0013557 A1 | 1/2013 | Kunath et al. | |
| 2013/0117322 A1* | 5/2013 | Fischer | G06F 17/30289 |
| | | | 707/792 |
| 2014/0236995 A1* | 8/2014 | Spindler | G06F 17/276 |
| | | | 707/772 |
| 2014/0274154 A1* | 9/2014 | Rana | G06Q 30/0282 |
| | | | 455/456.3 |

* cited by examiner

ONBOARD UNIT AND METHOD FOR UPDATING GEODATA THEREIN

CROSS-REFERENCE TO RELATED APPLICATION(S)

This application claims priority to European Patent Application No. 14 161 989.0, filed on Mar. 27, 2014, the entirety of which is incorporated by reference herein.

BACKGROUND

Technical Field

The present subject matter relates to an onboard unit for levying toll for a vehicle, comprising a satellite navigation receiver for generating position fixes, a memory for recording geoobjects, a radio interface and a processor connected to these components, which is configured to generate toll data from a geographical comparison of position fixes with geoobjects in a digital map and to transmit this data via the radio interface. The present subject matter also relates to a method for updating geodata in such an onboard unit.

Background Art

Onboard units (OBUs) based on satellite navigation systems (global navigation satellite systems, GNSSs) usually use, as radio interface, a mobile radio module for terrestrial mobile radio networks (public land mobile networks, PLMNs) and are therefore also referred to as GNSS/PLMN OBUs. For the aforementioned geographical comparison ("map matching") of the GNSS position fixes with the geoobjects stored in the OBU, it is necessary to quickly locate the closest geoobjects. To this end, a wide range of geographical or two-dimensional indices are currently used, such as quadtrees, R-trees or kd-trees and developments thereof, for example see Hanan Samet, "Foundations of Multidimensional and Metric Data Structures", Morgan Kaufmann, 2006; M. deBerg et al., "Computational Geometry—Algorithms and Applications", Springer, 1997; or Yannis Manolopoulos et al., "R-Trees: Theory & Applications", Springer, 2006. Index trees of this type are optimised toward the data field to be searched ("balanced") in order to minimise the average access time to the geoobjects arranged at the branch tips of the tree. Index trees and geoobjects are therefore coordinated with one another, which, for the updating of individual geoobjects, generally means that the index can also be recalculated. This requires either the transmission of greater data volumes via the radio interface, if the calculation is made centrally, or a higher computing power in the OBUs, if these perform the calculation decentrally, which in either case provides problems with the updating of geoobjects and indices thereof. The object of the disclosed subject matter is to create a solution to these problems.

BRIEF SUMMARY

In a first aspect, this object is achieved with an onboard unit of the type mentioned in the introduction, which is characterised in accordance with an embodiment in that the memory has:
an index memory region in which an index tree for geoobjects is stored, of which the outermost branches are each assigned to a cell of the digital map and carry a leaf with identifiers of geoobjects of this cell,
a first static object memory region, in which a primary list with geoobjects and identifiers thereof is stored, and
a second object memory region, which can be written dynamically via the radio interface and in which at least one secondary list with geoobjects and identifiers thereof is stored;
wherein at least one leaf of the index tree contains a reference to a secondary list; and
wherein the processor is configured, upon accessing a geoobject via a leaf, when this contains a reference to a secondary list, to use the secondary list as a matter of priority before the primary list.

In a second aspect a method is disclosed for updating geodata in such an onboard unit, comprising:
creating a secondary list in a central unit,
transmitting the secondary list, without index tree and without primary list, from the central unit to the onboard unit and receiving the secondary list in the onboard unit via the functional interface.

In accordance with an embodiment, the geoobjects to be held in the OBU are divided into a master record ("primary list") of statically stored geoobjects and an update record ("secondary list") of dynamically updateable geoobjects, wherein, for updating, only the latter needs to be transmitted via the radio interface, because the index tree is equipped with references or links to the secondary list. This saves on the one hand considerable bandwidth for the updating via the radio interface, because neither the index tree nor the comprehensive primary list has to be transmitted, and on the other hand the index tree in the OBU does not have to be recalculated, which spares high computing power in the OBU.

In order to facilitate the storing of the updated secondary list(s) in the OBU, an identifier of the branch carrying the leaf with the reference to this secondary list can also be transmitted with each secondary list, and the secondary list is stored in the second object memory region at the location specified by this reference.

In accordance with further embodiments, either a dedicated secondary list for at least two leaves can be stored in the OBU in the second object memory range, which facilitates the management and calculation of the secondary lists, or at least two leaves can refer to the same secondary list, which minimises the necessary storage space in the OBU.

With the aid of the secondary list(s), geoobjects can be added into the OBU, deleted therefrom or updated, without having to transmit or recalculate the index tree and the primary list. For deletion operations, at least one geoobject in the secondary list in the OBU may be provided with a "deleted"-flag, and the processor is configured, upon accessing a geoobject of which the "deleted"-flag has been set, to ignore this geoobject. Addition operations can be performed easily by adding a new geoobject into the secondary list, and update operations can be performed optionally by a combination thereof, specifically deletion of the old versions of the geoobject with the aid of the "deleted"-flag and addition of the new version of the same geoobject.

More than one new geoobject can also be added into a leaf of the index tree by storing this plurality of added geoobjects in a chained manner in the secondary list to which this leaf refers. To this end, at least one geoobject of the secondary list may contain the identifier of a further geoobject of the secondary list.

This concept of chained storage of geoobjects can also be used in the primary list in order to save memory space in the leaves of the index tree in that at least one geoobject of the primary list contains the identifier of a further geoobject of the primary list.

The management of the dynamically describable object memory region for the secondary list can be simplified if the geoobjects in the secondary list are all of identical size. When updating the secondary list, individual geoobjects therein can thus be overwritten easily.

The disclosed onboard unit and method are suitable for any type of geographical index, for example the structures explained in the introduction, such as quadtrees, R-trees or kd-trees. The index tree may be a balanced quadtree, which is particularly well suited for the searching of the closest geoobjects in the case of map matching.

Further features and advantages, as well as the structure and operations of various embodiments, are described in detail below with reference to the accompanying drawings.

BRIEF DESCRIPTION OF THE DRAWINGS/FIGURES

The present subject matter will be described in greater detail hereinafter on the basis of exemplary embodiments illustrated in the accompanying drawings, in which.

Embodiments will now be described with reference to the accompanying drawings.

DETAILED DESCRIPTION

Figure 1:
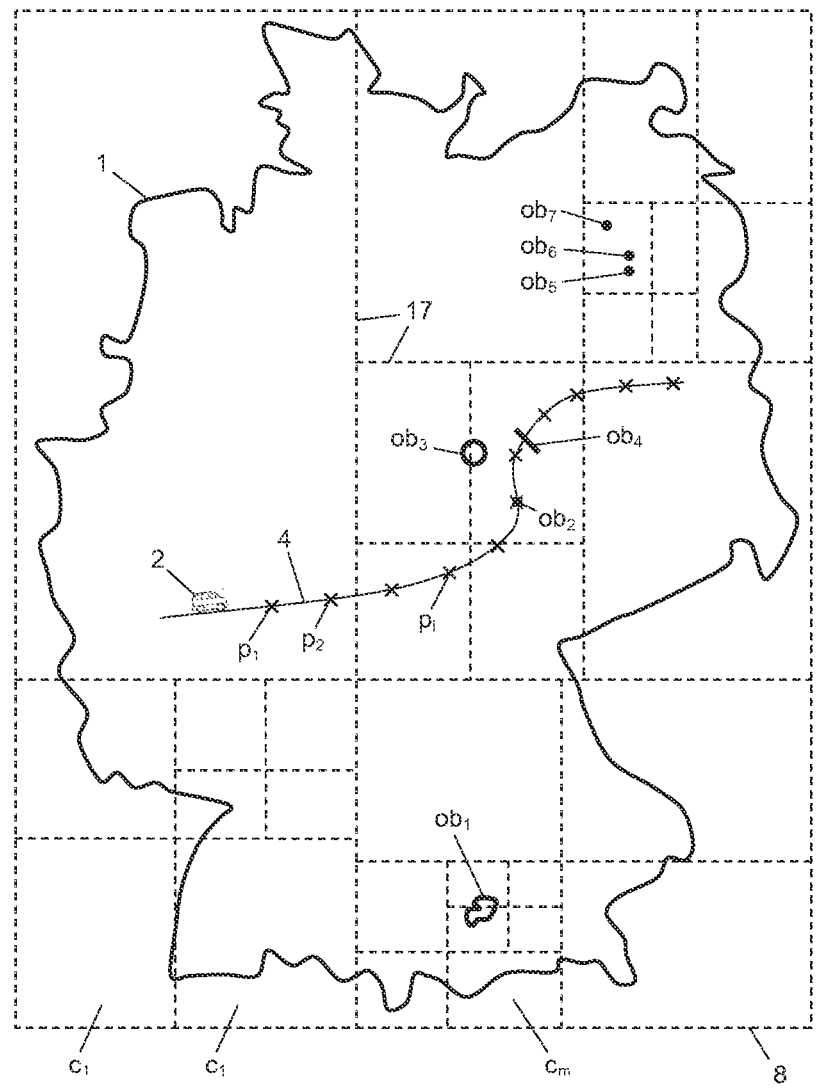
FIG. 1 shows a digital map with geoobjects and a quadtree index tree for the locating thereof.
Figure 3:
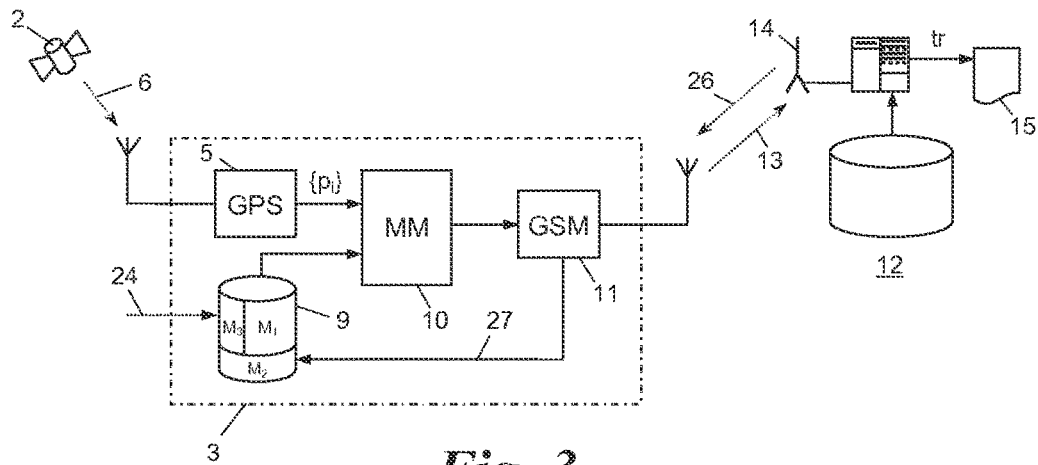
FIG. 3 shows a block diagram of the onboard unit for carrying out the method of an embodiment in conjunction with a satellite navigation system and a central unit of a road toll system.

FIG. 1 shows a geographical area 1, in which a vehicle 2 with an onboard unit (OBU) 3 is moving on a path 4, for example. To determine the path 4 for toll levying purposes, the OBU 3 is equipped with a satellite navigation receiver 5, see FIG. 3, which receives satellite navigation data 6 from a global satellite navigation system (GNSS) 7 and from this continuously generates position fixes $p_1, p_2, \ldots$, generally $p_i$.

FIG. 1 at the same time shows a digital map 8 of the geographical area 1, in which geoobjects $ob_1, ob_2, \ldots$, generally $ob_j$, of actual geographical objects of the geographical region 1 are stored. Examples of geoobjects $ob_j$ are area boundaries, such as city borders, parking space borders, inner city borders, etc. (see $ob_1$, $ob_3$), transfer points, such as country borders, entry or exit borders, barriers, etc. (see $ob_4$), or crossing points, such as locations such as "virtual toll points", check points, etc. (see $ob_2$, $ob_5$, $ob_6$, $ob_7$). The geoobjects $ob_j$ are stored in an internal memory 9 of the OBU 3, of which the structure will be explained in greater detail later on the basis of FIG. 4.

An internal processor 10 of the OBU 3 continuously compares the sequence $\{p_i\}$ of position fixes $p_i$ with the geoobjects $ob_j$ stored in the memory 9 in order to determine the closest geoobject(s) $ob_j$ and to detect from this the passing for example of a border, toll levying point, a check point, or the residence in a certain area or on a certain road portion, etc. The result of this geographical comparison ("map matching") serves as a basis for the generation of corresponding toll data tr, which is then transmitted by the processor 10 via a radio interface 11 of the OBU 3 to a remote central unit 12 for evaluation or toll levying of the path 4 of the vehicle 2 (arrow 13).

The radio interface 11 is for example a mobile radio module for a mobile radio network 14, for example according to a 3G, 4G or 5G radio network standard, such as GSM, UMTS or LTE, via which the central unit 12 is connected to the OBU 3. The central unit 12 can generate, from the received toll data tr, corresponding paths or toll protocols 15 for levying tolls for the location uses of the vehicle 2, as known in the art.

Figure 2:
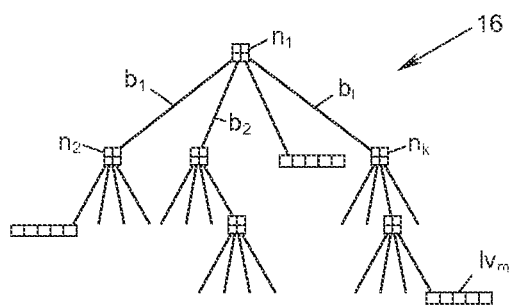
FIG. 2 shows the quadtree index tree of FIG. 1 in another schematic illustration style.
Figure 4:
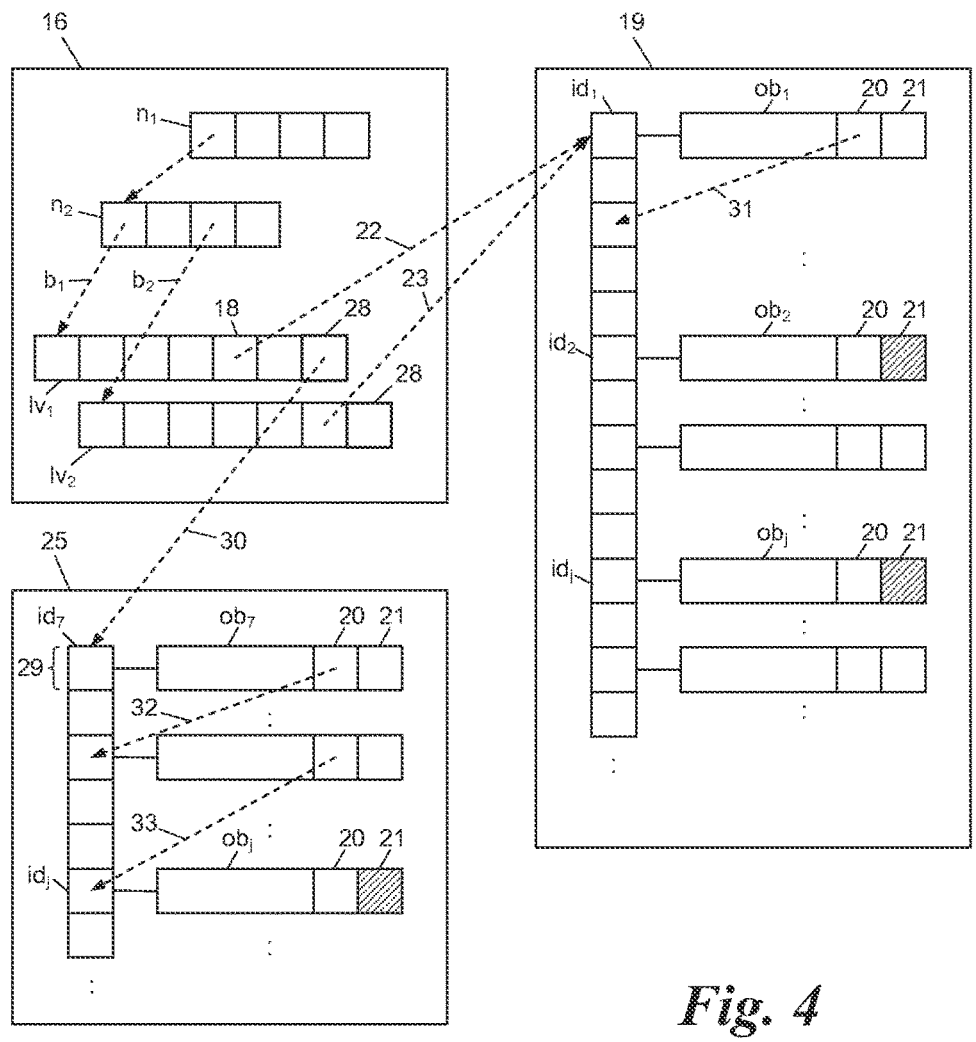
FIG. 4 shows the internal structure of the memory of the onboard unit of FIG. 3.

In order to quickly locate the closest geoobject(s) $ob_j$ at one or more position fixes $p_i$, the geoobjects $ob_j$ in the digital map 8 or the memory 9 of the OBU 3 are indexed, more specifically with a hierarchical index in the form of an index tree 16, which is illustrated in FIGS. 1, 2 and 4 in various illustration styles.

The index tree 16 may be a geographical, that is to say two-dimensional, index of the quadtree, R-tree or kd-tree type or the like, and FIGS. 1, 2 and 4 show the special embodiment of a quadtree, in which each node $n_1, n_2, \ldots$, generally $n_k$, branches in each case to four branches $b_1, b_2, \ldots$, generally $b_1$, which, at the ends thereof, branch or not via further nodes $n_k$ to further branches $b_1$.

The outermost branches $b_1$ distanced furthest from the "original" node (the root) $n_1$ of the index tree 16 are each assigned to a cell $c_1, c_2, \ldots$, generally $c_m$, of the digital map 8 and carry a "leaf" $lv_1, lv_2, \ldots$, generally $lv_m$, which contains or references the geoobjects $ob_j$ contained in this cell $c_m$, as will be explained later with reference to FIG. 4.

FIG. 1 illustrates the fact that such a quadtree index tree 16 divides the digital map 8 into successive smaller cell quadruples nested one inside the other. The geographical division lines 17 between the cells $c_m$, and therefore the branches $b_1$ and nodes $n_k$ of the index tree 16, are selected such that the most uniform distribution possible of the number of geoobjects $ob_j$ over the leaves $lv_m$ or cells $c_m$ is achieved. This minimises the average access time to the geoobjects $ob_j$ when searching through the index tree 16, as known to a person skilled in the art.

FIG. 4 shows another illustration of the same index tree 16 with (here by way of example) two nodes $n_1, n_2$, of which the hierarchically lower node $n_2$ branches in two branches $b_1$ and $b_2$, illustrated by way of example and each having a leaf $lv_1, lv_2$. Each leaf $lv_m$ comprises a limited number of memory cells 18 for object identifiers $id_j$ of geoobjects $ob_j$, which are stored in a first list or "primary list" 19 of geoobjects $ob_j$.

Each geoobject $ob_j$ of the primary list 19 is stored therein with its object identifier $id_j$ and may additionally contain a chain field 20 and a "deleted"-flag 21, the functions of which will be discussed later in greater detail. Each memory cell 21 of a leaf $lv_m$, which stores an object identifier $id_j$, thus refers to a geoobject $ob_j$ of the primary list 19, for example see the link 22. Two leaves $lv_1, lv_2$ can also refer to the same geoobject $ob_j$ of the primary list 19, as shown by the two links 22, 23.

The index tree 16 and the primary list 19 can be stored in the memory 9 of the OBU 3, for example with the delivery of the OBU 3 to the user, see arrow 24. Since the primary list 19 may contain a very large number of geoobjects $ob_j$ in the case of a large geographical area 1, for example thousands or tens of thousands of geoobjects $ob_j$, the primary list 19 is very comprehensive and the structure of a balanced index tree 16 is very complex, and an updating during running operation via the radio interface 11 is not practicable for the reasons mentioned in the introduction. Although only few geoobjects $ob_j$ would be transmitted via the radio interface

11, a recalculation of the index tree 16 in order to balance this out so as to minimise access time is difficult to implement with a limited computing power in the OBU 3. The below-described extension of the presented system is used to minimise the updating and calculation effort of the index tree 16 and of the geoobjects $ob_j$.

The memory 9 of the OBU 3 is divided into a first static object memory region $M_1$, which contains the primary list 19, and a second dynamic object memory region $M_2$, which contains a second list or "secondary list" 25 with geoobjects $ob_j$ that can be updated dynamically. The index tree 16 is stored in a separate static index memory region $M_3$ of the memory 9. The term "static" storage of the index tree 16 and of the primary list 19 in the memory regions $M_1$ and $M_3$ is understood to mean a feed repeated just once or seldom via the data path 24. The term "dynamic" storage of the secondary list 25 in the object memory region $M_2$ is understood to mean a feed from the central unit 12 via the radio interface 11 during running operation of the OBU 3 (see data paths 26, 27).

The leaves $lv_m$ of the index tree 16 are additionally each provided with a reference field 18 to an entry 29 in the secondary list 25, which entry 29, as in the primary list 19, contains an identifier $id_j$ of a geoobject $ob_j$, this geoobject $ob_j$ and also (optionally) a chain field 20 and a "deleted"-flag 21. The reference field 28 of the leaf $lv_m$ stores, for example directly, the object identifier $id_j$ of the geoobject $ob_j$ of the entry 29 of the secondary list 25, which produces a link 30.

When the processor 10 of the OBU 3 in the case of the aforementioned map matching and search for this purpose through the index tree 16 comes across a leaf $lv_m$, in the reference field 28 of which an object identifier $id_j$ is stored, it removes the object $ob_j$ thus referenced from the secondary list 26 instead of from the primary list 19, and the secondary list is used as a matter of priority before the primary list 19 with regard to the same geoobject $ob_j$.

If, in the primary list 19, no such object $ob_j$ was present, the locating of the object $ob_j$ in the secondary list 25 corresponds to an "addition" of a new geoobject $ob_j$ in a leaf $lv_m$ and the existence of geoobjects $ob_j$ in the OBU 3. If a geoobject $ob_j$ of the identifier $id_j$ located in the secondary list 25 was also present in the primary list 19, this corresponds to a "replacement". The "deleted"-flag 21 of a geoobject $ob_j$ in the secondary list 25 (and additionally also in the primary list 19) can be used to "delete" a geoobject $ob_j$ by setting the "deleted"-flag 21, and the processor 10 ignores geoobjects $ob_j$ with set flag 21 when performing map matching. A "replacement" can additionally also be performed by initially deleting a geoobject $ob_j$ with the identifier $id_j$ and then adding it in again.

A dedicated secondary list 25 can be created in the second object memory region $M_2$ for each leaf $lv_m$ of the index tree 16, or a common secondary list 27 can be used for all (or at least a number of) leaves $lv_m$.

The chain fields 20 in the primary and secondary lists 19, 25 can be used to refer from a geoobject $ob_j$ located via the links 22, 23, 30 to another geoobject $ob_j$ in the respective primary or secondary list 19, 25, see the chains 31, 32, 33. For example with the aid of a single reference 30 from a leaf $lv_m$ to the secondary list 25 or an entry 29 therein, it is thus possible to reference an entire row of newly added or updated geoobjects $ob_j$ or geoobjects $ob_j$ intended for deletion, that is to say to assign these geoobjects to the leaf $lv_m$. A change of the leaf $lv_m$ in the index tree 16 (and therefore in the static index memory region $M_3$) is not necessary for this purpose, and therefore the index tree 16 is hereby also updated so to speak. The secondary list 25 thus enables a dynamic updating at the same time both of the index tree 16 in the index memory region $M_1$ and of the primary list 19 in the first object memory region $M_2$.

In order to quickly store a secondary list 25 received via the radio interface 11 in the OBU 3, an identifier of the branch $b_1$ carrying the leaf $lv_m$ with the reference 28 to this secondary list 25 can also be transmitted with each secondary list 25, and the secondary list 25 can be stored in the second object memory region $M_2$ at the location specified by this reference 28.

CONCLUSION

The invention is not limited to the presented embodiments, but includes all variants, combinations and modifications that lie within the scope of the accompanying claims.

What is claimed is:

1. An onboard unit for levying toll for a vehicle, comprising:
    a satellite navigation receiver for generating position fixes;
    a memory for recording geoobjects;
    a radio interface; and
    a processor coupled to the satellite navigation receiver, the memory, and the radio interface, the processor configured to generate toll data from a geographical comparison of position fixes with geoobjects in a digital map and to transmit this data via the radio interface;
    wherein the memory has:
        an index memory region, in which an index tree for geoobjects is stored, of which the outermost branches are each assigned to a cell of the digital map and carry a leaf with identifiers of geoobjects of this cell,
        a first static object memory region, in which a primary list with geoobjects and identifiers thereof is stored, and
        a second object memory region, which can be written dynamically via the radio interface and in which at least one secondary list with geoobjects and identifiers thereof is stored;
    wherein at least one leaf of the index tree contains a reference to a secondary list of the at least one secondary list;
    wherein the processor is configured, upon accessing a geoobject via a leaf of the index tree, when this leaf contains a reference to the secondary list of the at least one secondary list, to use the secondary list of the at least one secondary list as a matter of priority before the primary list; and
    wherein a dedicated secondary list for each of at least two leaves of the index tree is stored in the second memory region.

2. The onboard unit according to claim 1, wherein the geoobjects in the secondary list are all of identical size.

3. The onboard unit according to claim 1, wherein the index tree is a balanced quadtree.

4. An onboard unit for levying toll for a vehicle, comprising:
    a satellite navigation receiver for generating position fixes;
    a memory for recording geoobjects;
    a radio interface; and
    a processor coupled to the satellite navigation receiver, the memory, and the radio interface, the processor configured to generate toll data from a geographical comparison of position fixes with geoobjects in a digital map and to transmit this data via the radio interface;

wherein the memory has:
an index memory region, in which an index tree for geoobjects is stored, of which the outermost branches are each assigned to a cell of the digital map and carry a leaf with identifiers of geoobjects of this cell,
a first static object memory region, in which a primary list with geoobjects and identifiers thereof is stored, and
a second object memory region, which can be written dynamically via the radio interface and in which at least one secondary list with geoobjects and identifiers thereof is stored;

wherein at least one leaf of the index tree contains a reference to a secondary list of the at least one secondary list;

wherein the processor is configured, upon accessing a geoobject via a leaf of the index tree, when this leaf contains a reference to the secondary list of the at least one secondary list, to use the secondary list of the at least one secondary list as a matter of priority before the primary list;

wherein at least two leaves of the index tree refer to the same secondary list.

5. The onboard unit according to claim 4, wherein the index tree is a balanced quadtree.

6. An onboard unit for levying toll for a vehicle, comprising:
a satellite navigation receiver for generating position fixes;
a memory for recording geoobjects;
a radio interface; and
a processor coupled to the satellite navigation receiver, the memory, and the radio interface, the processor configured to generate toll data from a geographical comparison of position fixes with geoobjects in a digital map and to transmit this data via the radio interface;

wherein the memory has:
an index memory region, in which an index tree for geoobjects is stored, of which the outermost branches are each assigned to a cell of the digital map and carry a leaf with identifiers of geoobjects of this cell,
a first static object memory region, in which a primary list with geoobjects and identifiers thereof is stored, and
a second object memory region, which can be written dynamically via the radio interface and in which at least one secondary list with geoobjects and identifiers thereof is stored;

wherein at least one leaf of the index tree contains a reference to a secondary list of the at least one secondary list;

wherein the processor is configured, upon accessing a geoobject via a leaf of the index tree, when this leaf contains a reference to the secondary list of the at least one secondary list, to use the secondary list of the at least one secondary list as a matter of priority before the primary list;

wherein at least one geoobject in the secondary list is provided with a "deleted"-flag, and the processor is configured, upon accessing a geoobject of which the "deleted"-flag is set, to ignore this geoobject.

7. The onboard unit according to claim 6, wherein the index tree is a balanced quadtree.

8. An onboard unit for levying toll for a vehicle, comprising:
a satellite navigation receiver for generating position fixes;
a memory for recording geoobjects;
a radio interface; and
a processor coupled to the satellite navigation receiver, the memory, and the radio interface, the processor configured to generate toll data from a geographical comparison of position fixes with geoobjects in a digital map and to transmit this data via the radio interface;

wherein the memory has:
an index memory region, in which an index tree for geoobjects is stored, of which the outermost branches are each assigned to a cell of the digital map and carry a leaf with identifiers of geoobjects of this cell,
a first static object memory region, in which a primary list with geoobjects and identifiers thereof is stored, and
a second object memory region, which can be written dynamically via the radio interface and in which at least one secondary list with geoobjects and identifiers thereof is stored;

wherein at least one leaf of the index tree contains a reference to a secondary list of the at least one secondary list;

wherein the processor is configured, upon accessing a geoobject via a leaf of the index tree, when this leaf contains a reference to the secondary list of the at least one secondary list, to use the secondary list of the at least one secondary list as a matter of priority before the primary list;

wherein at least one geoobject of the secondary list of the at least one secondary list contains the identifier of a further geoobject of the secondary list of the at least one secondary list.

9. The onboard unit according to claim 8, wherein the index tree is a balanced quadtree.

10. An onboard unit for levying toll for a vehicle, comprising:
a satellite navigation receiver for generating position fixes;
a memory for recording geoobjects;
a radio interface; and
a processor coupled to the satellite navigation receiver, the memory, and the radio interface, the processor configured to generate toll data from a geographical comparison of position fixes with geoobjects in a digital map and to transmit this data via the radio interface;

wherein the memory has:
an index memory region, in which an index tree for geoobjects is stored, of which the outermost branches are each assigned to a cell of the digital map and carry a leaf with identifiers of geoobjects of this cell,
a first static object memory region, in which a primary list with geoobjects and identifiers thereof is stored, and
a second object memory region, which can be written dynamically via the radio interface and in which at least one secondary list with geoobjects and identifiers thereof is stored;

wherein at least one leaf of the index tree contains a reference to a secondary list of the at least one secondary list;

wherein the processor is configured, upon accessing a geoobject via a leaf of the index tree, when this leaf contains a reference to the secondary list of the at least one secondary list, to use the secondary list of the at least one secondary list as a matter of priority before the primary list;

wherein at least one geoobject of the primary list contains the identifier of a further geoobject of the primary list.

11. The onboard unit according to claim 10, wherein the index tree is a balanced quadtree.

12. A method for updating geodata in an onboard unit that includes a radio interface, comprising:

generating toll data from a geographical comparison of position fixes with geoobjects in a digital map;

storing an index tree for geoobjects in an index memory region of a memory in the onboard unit, of which the outermost branches are each assigned to a cell of the digital map and carry a leaf with identifiers of geoobjects of the cell;

storing a primary list with geoobjects and identifiers thereof in a first static object memory region of the memory;

storing at least one secondary list with geoobjects and identifiers thereof in a second object memory region of the memory, wherein at least one leaf of the index tree contains a reference to a secondary list of the at least one secondary list; and upon accessing a geoobject via a leaf of the index tree that contains a reference to the secondary list of the at least one secondary list, using the secondary list of the at least one secondary list as a matter of priority before the primary list;

wherein the secondary list of the at least one secondary list is created in a central unit and transmitted, without the index tree and without the primary list, from the central unit to the onboard unit and received in the onboard unit via the radio interface for storing in the second object memory region.

13. The method according to claim 12, wherein an identifier of the branch carrying the leaf with the reference to the created secondary list is also transmitted with the created secondary list, and the created secondary list is stored in the second object memory region at the location specified by the reference to the created secondary list.

14. The method according to claim 12, wherein the index tree is a balanced quadtree.

* * * * *